US010400421B2

(12) United States Patent
Nguyen et al.

(10) Patent No.: US 10,400,421 B2
(45) Date of Patent: Sep. 3, 2019

(54) SYSTEMS AND METHODS FOR BACKFLUSHING A RISER TRANSFER PIPE

(71) Applicant: Hydril USA Distribution LLC, Houston, TX (US)

(72) Inventors: Dat Manh Nguyen, Houston, TX (US); Ahmet Duman, Houston, TX (US); Edward Walfred Eskola, Houston, TX (US)

(73) Assignee: Hydril USA Distribution LLC, Houston, TX (US)

(*) Notice: Subject to any disclaimer, the term of this patent is extended or adjusted under 35 U.S.C. 154(b) by 254 days.

(21) Appl. No.: 15/446,548

(22) Filed: Mar. 1, 2017

(65) Prior Publication Data

US 2017/0254044 A1 Sep. 7, 2017

Related U.S. Application Data

(60) Provisional application No. 62/302,486, filed on Mar. 2, 2016.

(51) Int. Cl.
*E02F 3/90* (2006.01)
*E02F 3/88* (2006.01)
(Continued)

(52) U.S. Cl.
CPC ............ *E02F 3/902* (2013.01); *E02F 3/8833* (2013.01); *E02F 3/8858* (2013.01); *E21C 50/00* (2013.01);
(Continued)

(58) Field of Classification Search
CPC ..... E02F 3/88-8891; E02F 3/90; E02F 3/902; E02F 7/00; E02F 7/005; E02F 7/02; E02F 7/023; E02F 7/10; E21C 50/00
See application file for complete search history.

(56) References Cited

U.S. PATENT DOCUMENTS 3,765,727 A * 10/1973 Santangelo ............ E02F 3/907 37/309
3,783,535 A * 1/1974 Hanks ....................... E02F 3/88 37/316
(Continued)

FOREIGN PATENT DOCUMENTS

WO 2015/005782 1/2015

OTHER PUBLICATIONS

Leach, S., et al., "SME Special Session: Subsea Slurry Lift Pump Technology—SMS Development," Offshore Technology Conference, pp. 1-2 (2012) (Abstarct).
(Continued)

*Primary Examiner* — Matthew Troutman
(74) *Attorney, Agent, or Firm* — Hogan Lovells US LLP

(57) ABSTRACT

A method of pumping material from a sea floor to a vessel on a sea surface, including the steps of collecting material from the sea floor using a production tool, connecting the production tool to the vessel with a riser including a riser transfer pipe, and pumping the material from the production tool to the vessel using a subsea slurry lift pump positioned between the production tool and the vessel and attached to the production tool by the riser transfer pipe. The method further includes backflushing the riser transfer pipe by running seawater through the slurry lift pump into the riser transfer pipe toward the production tool.

20 Claims, 5 Drawing Sheets

(51) Int. Cl.

| | |
|---|---|
| ***F04B 43/02*** | (2006.01) |
| ***E21C 50/00*** | (2006.01) |
| ***F04B 43/073*** | (2006.01) |
| ***F04B 47/06*** | (2006.01) |
| *G05D 16/20* | (2006.01) |

(52) U.S. Cl.

CPC ............ *F04B 43/02* (2013.01); *F04B 43/073* (2013.01); *F04B 47/06* (2013.01); *G05D 16/2013* (2013.01)

(56) References Cited

U.S. PATENT DOCUMENTS

| | | | | |
|---|---|---|---|---|
| 4,074,779 | A | 2/1978 | Cheung et al. | |
| 4,979,322 | A * | 12/1990 | Sloan | E02F 3/88 37/322 |
| 5,083,386 | A * | 1/1992 | Sloan | E02F 3/88 37/309 |
| 6,817,119 | B2 * | 11/2004 | Kerfoot | B09C 1/00 37/195 |
| 7,591,088 | B1 * | 9/2009 | Schuh | E02F 3/885 37/311 |
| 8,430,112 | B2 | 4/2013 | Matheis et al. | |
| 9,243,497 | B2 * | 1/2016 | Jones | B63C 11/52 |
| 9,957,694 | B2 * | 5/2018 | Jones | E02F 7/005 |
| 10,094,091 | B1 * | 10/2018 | Tesvich | E02F 3/8858 |
| 2002/0066596 | A1 | 6/2002 | Judge et al. | |
| 2006/0231262 | A1 * | 10/2006 | Jacobsen | E02F 3/8858 166/358 |
| 2011/0309668 | A1 | 12/2011 | Efthymiou et al. | |
| 2013/0312296 | A1 * | 11/2013 | Jones | B63C 11/52 37/317 |
| 2014/0137442 | A1 | 5/2014 | Jones et al. | |
| 2014/0318803 | A1 | 10/2014 | Patriciu | |
| 2015/0240578 | A1 | 8/2015 | Duman et al. | |

OTHER PUBLICATIONS

International Search Report and Written Opinion issued in connection with corresponding PCT Application No. PCT/US2017/20344 dated May 12, 2017.

* cited by examiner

SYSTEMS AND METHODS FOR BACKFLUSHING A RISER TRANSFER PIPE

CROSS REFERENCE TO RELATED APPLICATIONS

This application claims priority to and the benefit of, U.S. Provisional Application Ser. No. 62/302,486, filed Mar. 2, 2016, the full disclosure of which is hereby incorporated herein by reference in its entirety for all purposes.

BACKGROUND

1. Field of Invention

This invention relates in general to equipment used in subsea applications, and in particular, to systems and methods for subsea mining operations.

2. Description of the Prior Art

During certain subsea mining operations, material is typically cut from the sea floor and raised to a surface vessel using a lift pump. In some cases, a collecting tool can pick up the material, which is then transferred to the surface vessel via a riser transfer pipe and a riser. The lift pump can be positioned between the riser transfer pipe and the riser. The material can be pulled from the collecting tool to the pump through the riser transfer pipe, and then pushed by the pump through the riser to the vessel.

Generally, the material flows through the riser transfer pipe in the form of a slurry that includes solid material mined from the sea floor, mixed with seawater or other fluid. The nature of the slurry, however, is such that at times the riser transfer pipe can become clogged, or flow can otherwise be diminished by the passage of large or irregularly shaped particles of material in the slurry, or by the adhesion of multiple pieces of material together within the slurry. Such clogs and reduction in slurry flow through the riser transfer pipe can lead to costly downtime to clear the riser transfer pipe in order to resume operations.

SUMMARY

One embodiment of the present technology provides a system for pumping material from a sea floor to a vessel. The system includes a subsea production tool to collect material on the sea floor, a vessel positioned on the sea surface in communication with the subsea production tool to receive the material collected by the subsea production tool, and a riser attached to the vessel and extending toward the sea floor. The system also includes a lift pump in communication with the riser and the subsea production tool to pump the material collected on the sea floor to the vessel via the riser, and a riser transfer pipe connecting the subsea production tool and the lift pump. The lift pump includes a slurry inlet line attached to the riser transfer pipe, a slurry return line attached to the riser, and a pump chamber between the slurry inlet line and the slurry return line to pump the material from the riser transfer pipe into the riser via the slurry inlet line and the slurry return line. In addition, the lift pump includes a seawater supply line in fluid communication with the pump chamber to provide seawater to power the pump chamber, and a backflush valve between the slurry inlet line and the seawater supply line to selectively allow fluid communication between the slurry inlet line and the seawater supply line so that seawater can enter the slurry inlet line and riser transfer pipe to backflush the riser transfer pipe.

Another embodiment of the present technology provides a method of pumping material from a sea floor to a vessel on a sea surface. The method includes the steps of collecting material from the sea floor using a production tool, connecting the production tool to the vessel with a riser including a riser transfer pipe, and pumping the material from the production tool to the vessel using a subsea slurry lift pump positioned between the production tool and the vessel and attached to the production tool by the riser transfer pipe. The method also includes backflushing the riser transfer pipe by running seawater through the slurry lift pump into the riser transfer pipe toward the production tool.

Yet another embodiment of the present technology includes a method of clearing a riser transfer pipe during a subsea mining operation. The method includes the steps of providing a production tool to collect material from the sea floor, a vessel to convey the material, and a subsea slurry lift pump to pump the material from the production tool to the vessel via a riser including the riser transfer pipe, and backflushing the riser transfer pipe by running seawater through the slurry lift pump into the riser transfer pipe toward the production tool.

BRIEF DESCRIPTION OF THE DRAWINGS

The present technology will be better understood on reading the following detailed description of non-limiting embodiments thereof, and on examining the accompanying drawings, in which.

DETAILED DESCRIPTION OF THE INVENTION

Figure 1:
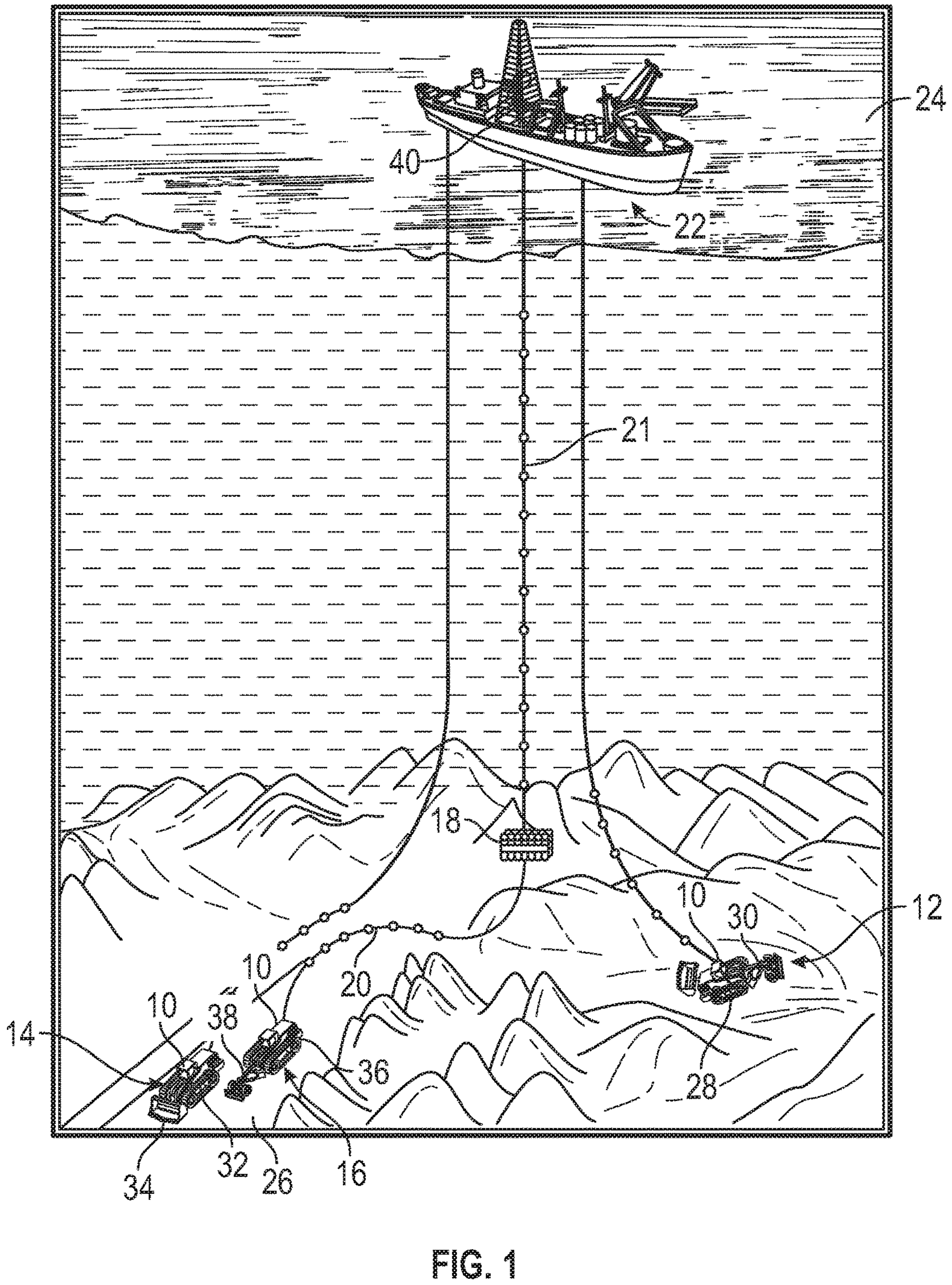
FIG. 1 is an overall system view of a subsea production operation, including a subsea slurry lift pump (SSLP) and a riser transfer pipe (RTP), according to an embodiment of the present technology.

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The invention, however, is not intended to be limited to the specific terms used, and it is to be understood that each specific term includes equivalents that operate in a similar manner to accomplish a similar purpose.

FIG. 1 shows an overall system view of a subsea production operation, including subsea production tools 10, such as an auxiliary cutter 12, a bulk cutter 14, and a collecting machine 16. One or more of the subsea production tools 10 are connected to a subsea slurry lift pump (SSLP) 18 by a riser transfer pipe (RTP) 20. The SSLP 18 is in turn attached to the bottom end of a riser 21. The riser 21 connects the SSLP 18 to a production support vessel (PSV) 22 at the sea surface 24.

In practice, the seafloor production tools 10 combine to harvest material from the sea floor 26. For example, in certain embodiments, the auxiliary cutter 12 and bulk cutter 14 may utilize a cutting process to disaggregate material from the sea floor 26. The auxiliary cutter 12 may, for example, smooth rough terrain by cutting benches, or steps into the rough terrain. The auxiliary cutter 12 may be equipped with tracks 28, and may have a cutting head 30 capable of movement or rotation, for flexibility in cutting. The bulk cutter 14 may, for example, have a higher cutting capacity than the auxiliary cutter 12, and may be designed to work at cutting on the benches, or steps created by the auxiliary cutter 12. Like the auxiliary cutter 12, the bulk cutter 14 can have tracks 32 and a flexible cutting head 34. Both the auxiliary cutter 12 and the bulk cutter 14 may leave cut material on the sea floor 26 for collection by the collecting machine 16.

The collecting machine 16 can be a robotic vehicle, like the auxiliary cutter 12 and the bulk cutter 14, and serves to collect the material cut from the sea floor 26 by the auxiliary cutter 12 and the bulk cutter 14. Depending on the location of the operations, the material cut from the sea floor can be sand, gravel, silt, or any other material. The collecting machine 16 collects the cut material by combining it with seawater and drawing it into the machine in the form of a seawater slurry. The seawater slurry is then drawn through the RTP 20 from the collecting machine 16 to the SSLP 18. The collecting machine 16 may also be equipped with tracks 36, and a flexible collecting head 38.

In certain embodiments, the SSLP 18 includes numerous pumping mechanisms, valves, and fluid lines, each described in greater detail below, that work together to accept the slurry from the RTP 20 and pump the slurry up the riser 21 to the PSV 22 at the sea surface 24. At times, flow of the slurry through the RTP 20 may be slowed or stopped for various reasons, such as particularly large or irregular shaped cuttings, cuttings that remain bound together despite the seawater mixture, etc. In the event of such a reduction of slurry flow through the RTP 20, the SSLP 18 can be used to backflush the RTP 20 to restore adequate flow, as described in greater detail below.

According to certain embodiments of the present technology, the PSV 22 can be a ship, although in other embodiments it could alternately be, for example, a platform. The PSV 22 can include a moonpool 40 through which the SSLP 18 and riser 21 can be assembled and deployed during setup. Once the slurry arrives at the PSV 22, it may be dewatered, and then remaining dry material can be temporarily stored in the hull or offloaded onto a transportation vessel for shipment. The seawater exiting the dewatering process can be disposed in any acceptable fashion, including by being pumped back to the sea floor 26. In some embodiments, such seawater may be used to provide hydraulic power for operation of the SSLP 18.

Figure 2:
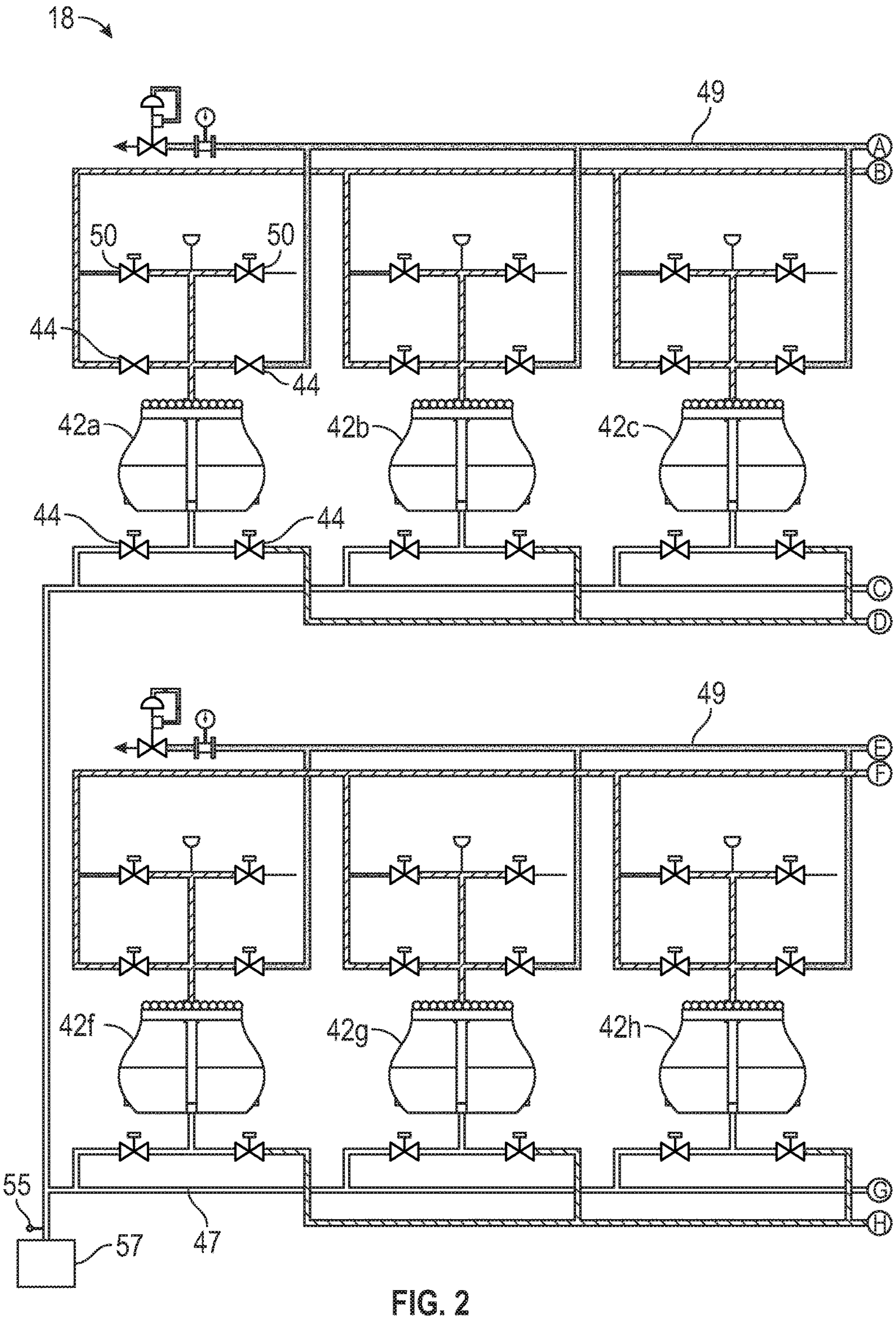
FIG. 2 is a schematic hydraulic diagram showing the valves and fluid lines of the SSLP.
Figure 2:
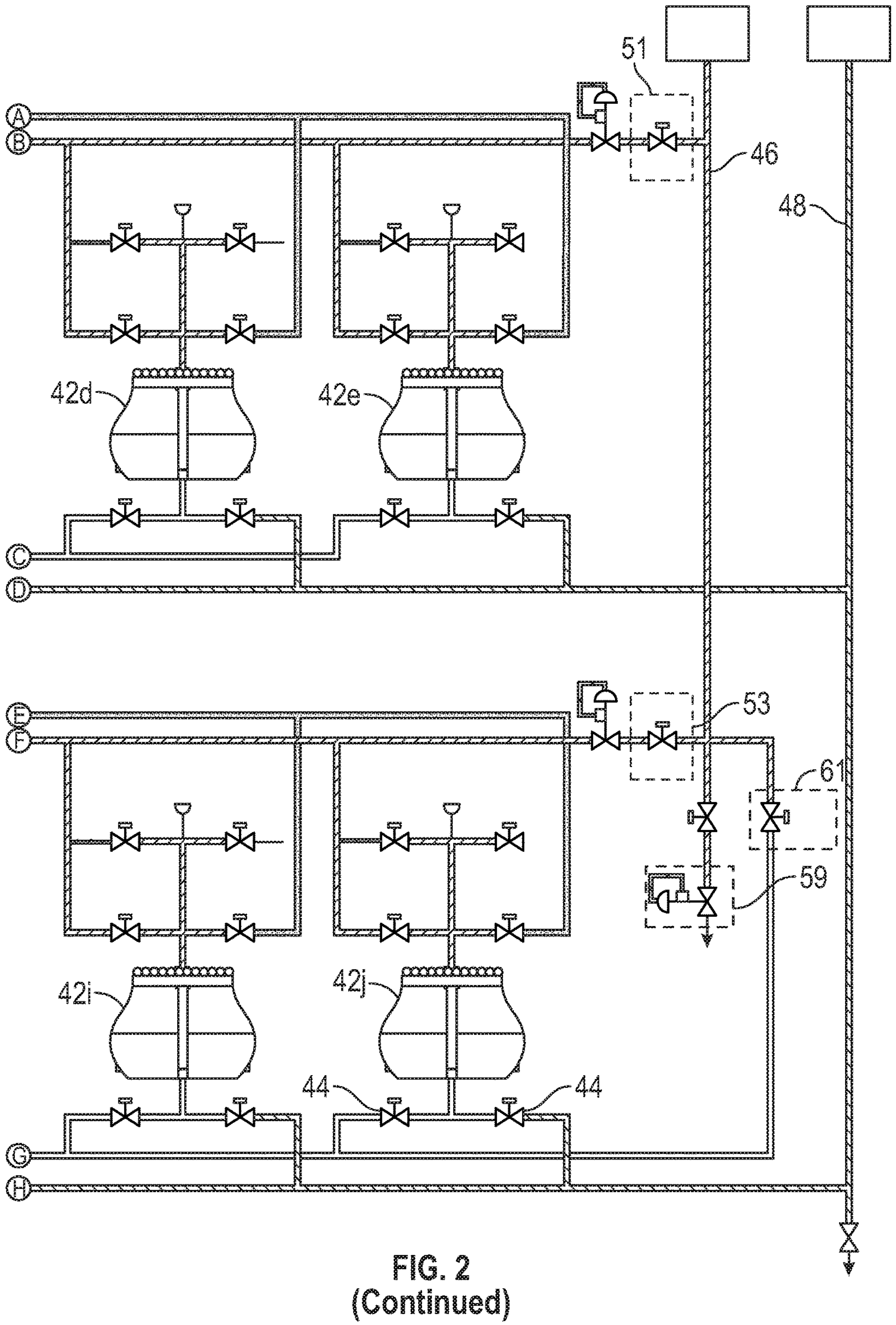

The SSLP 18 itself may be designed to be powered by seawater from the PSV 22. Such an arrangement is beneficial because it permits the prime movers of the pump to be located on the PSV 22, for ease of servicing and repair. Subsea components of the SSLP 18 are shown, for example in FIG. 2, and include pump chambers 42*a-j*, and isolation valves 44. The isolation valves 44 are interconnected by seawater supply lines 46, slurry inlet lines 47, slurry return lines 48, and seawater outlet lines 49, and can be hydraulically actuated. Also shown in FIG. 2 are a first isolation valve 51 and a second isolation valve 53. Each of the first isolation valve 51 and the second isolation valve 53 is positioned in the seawater supply lines 46, and can control the flow of seawater through certain of the seawater control lines 46 to a particular pump chamber 42 or group of pump chambers 42. The first and second isolation valves 51, 53 are instrumental in controlling flow through the SSLP 18. FIG. 2 also depicts an inlet pressure sensor 55 adjacent the connection point 57 between the RTP 20 (shown in FIG. 1) and the slurry inlet lines 47, as well as a choke pressure control, or dump valve 59, and backflush valve 61, which controls flow between the seawater supply lines 46 and the slurry inlet lines 47 in the event of a backflush operation.

In practice, the dump valve 59 can be used to control pressure within the various fluid lines of the SSLP 18. For example, the slurry inlet pressure can be determined using the pressure sensor 55. If the slurry inlet pressure reaches a maximum predetermined setpoint, the dump valve 59 can be opened, to bleed seawater from the system. If the slurry inlet pressure drops below a minimum setpoint, the dump valve 59 can be closed. Furthermore, if the cycle process exceeds the predetermined setpoint, the dump valve 59 can remain open and the operator alerted.

Each pump chamber 42 contains a diaphragm 43 (shown in FIGS. 3-5), typically made of an elastomeric material, and that provides a barrier within the pump chamber 42 between the fluid being pumped (e.g., the slurry), and the power fluid (e.g., seawater). In practice, the power fluid, or seawater, enters the pump chambers 42 via the seawater supply lines 46 and generates diaphragm movement within the pump chamber 42, which in turn pushes the fluid being pumped, or slurry, up a slurry return line 48. Such pumping action is more particularly shown in FIGS. 3-5.

Figure 3:
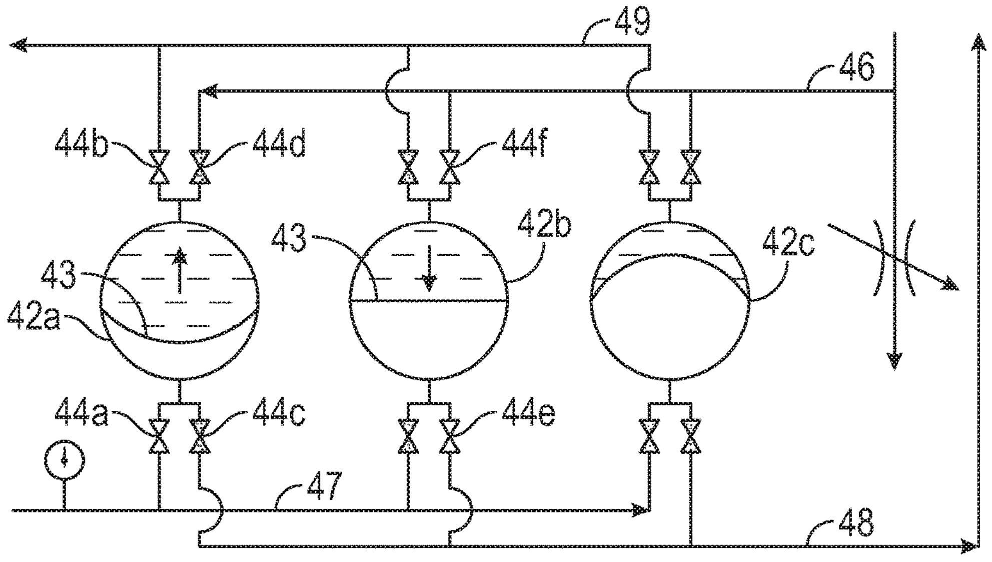
FIG. 3 is a schematic diagram showing a pumping system according to an embodiment of the present technology in a fill cycle.
Figure 4:
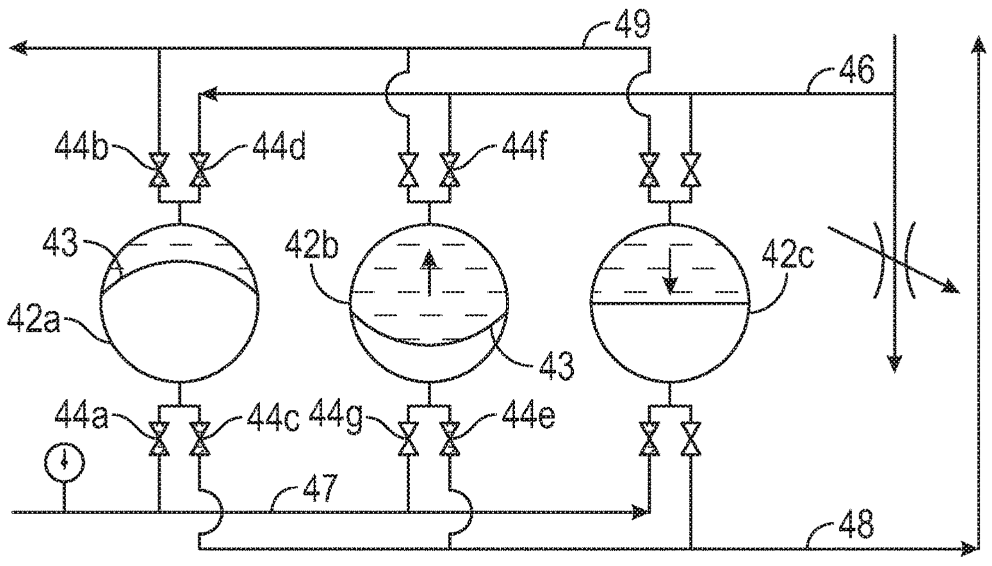
FIG. 4 is a schematic diagram showing the pumping system of FIG. 3 in a compression cycle.
Figure 5:
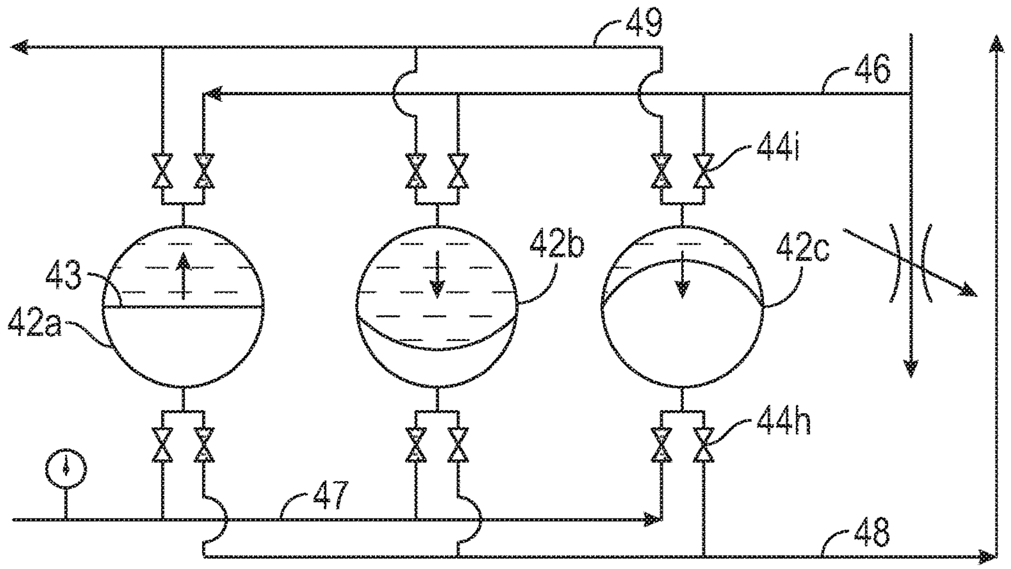
FIG. 5 is a schematic diagram showing the pumping system of FIGS. 3 and 4 in overlapping fill and compression cycles.

As shown in FIGS. 3-5, each pump chamber 42*a-c* may be equipped with four isolation valves 44 for controlling flow into and out of the pump chambers 42*a-c*. Each pump chamber 42*a-c* is connected to a slurry inlet line 47, a slurry return line 48, a seawater supply line 46, and a seawater outlet line 49. The pump chambers 42*a-c* can also each be equipped with compress valves and decompress valves 50 (shown in FIG. 2) designed to allow pressure within the pump chambers 42*a-c* to be raised or lowered to match the discharge pressure or fill pressure, respectively. In certain embodiments, the isolation valves 44 can be timed so that the pump chambers 42*a-c* cycle through pumping operations in an overlapping way, thereby helping to achieve substantially pulsationless flow on both the inlet and the outlet sides of the SSLP 18. In FIGS. 3-5, the number of pump chambers 42*a-c* shown is three, for the sake of simplicity. In practice, however, the pump chambers 42 can number up to 10 (as shown in FIG. 2), or any other appropriate number for a particular operation.

Referring to FIG. 3, there is shown a pumping system in a fill cycle. During the fill cycle, the leftmost pump chamber 42*a* includes a first slurry inlet valve 44*a* and a first seawater outlet valve 44*b* that are both open, and a first slurry return valve 44*c* and a first seawater inlet valve 44*d* that are closed. The collecting machine 16 forces the slurry through the RTP 20, into the slurry inlet line 47, and into the pump chamber 42*a* as indicated by the direction of the up arrow in pump chamber 42*a*. When the pump chamber 42*a* is full, the first slurry inlet valve 44*a* and first seawater outlet valve 44*b* are closed as shown in FIG. 4, which shows a compression cycle. At this point, the compress valve 50 (shown in FIG. 2) is opened to allow flow from the seawater supply line 46 to compress the chamber up to the discharge pressure, so that when the slurry return valve 44*c* is opened, there will not be a sudden pressure drop because the pump chamber 42*a* is already at the discharge pressure.

Referring back to FIG. 3, and particularly to middle pump chamber 42*b*, it can be seen that while the leftmost pump chamber 42*a* is filling, the middle pump chamber 42*b* is pumping out. A second slurry return valve 44*e* and a second seawater inlet valve 44*f* are open, so that seawater enters the pump chamber 42*b* and pushes the diaphragm 43 downward in the direction shown by the arrow, thereby expelling the slurry into the slurry return line 48. In the embodiments shown, the required pressure needed to push the diaphragm down and expel the slurry from the pump chamber 42*b* is provided by seawater. The volumetric flow rate of the seawater can be kept constant using, for example, a positive displacement pump (not shown). Such a positive displacement pump can be located, in some embodiments, on the PSV 22, and can further permit self-correction of the pressure to whatever pressure is required to move the slurry at the desired constant volumetric flow rate. In other words, as process conditions change, the SSLP 18 can maintain a constant flow rate by allowing pressure to fluctuate. This is advantageous because pumping pressure can vary depending on the level or concentration of solids in the slurry during operations.

Referring again to FIG. 4, after the diaphragm 43 in pump chamber 42*b* reaches a low point, which may be adjacent a bottom of the pump chamber 42*b*, the second slurry return valve 44*e* and the second seawater inlet valve 44*f* can be closed, thereby maintaining the discharge pressure within the pump chamber 42*b*. If the second slurry inlet valve 44*g* were opened at this time, absent some external control, a pressure wave could pass into the slurry return line, which is undesirable. To prevent this, a decompress valve 50 (shown in FIG. 2) can open when all seawater and slurry valves 44 associated with pump chamber 42*b* are closed, to lower the pressure within the pump chamber 42*b* to the slurry inlet pressure.

Finally, FIG. 5 shows how the cycles overlap to create pulsationless flow. In FIG. 5, the center pump chamber 42*b* is nearly empty of slurry. Prior to reaching the end of the stroke, the third slurry return valve 44*h* and third seawater inlet valve 44*i* can be opened to allow slurry to flow out of the rightmost pump chamber 42*c*, avoiding a discharge pressure spike.

In some instances, particularly during subsea mining operations such as those described above, the RTP 20 may have a tendency to become blocked or clogged, such as by irregularly shaped or high-volume solids. Some blockages can be severe enough to cause the flow of slurry through the RTP 20 to slow or even stop. Pressure at the slurry inlet, which may indicate such a blockage in flow, can be measure by the inlet pressure sensor 55. One solution to this problem is to periodically backflush the RTP 20, either on a schedule or as needed. To accomplish such a backflush, the valves 44 associated with pump chambers 42*a-j* can be activated in a predetermined sequence.

For example, referring back to FIG. 2, one possible control sequence for backflushing the RTP 20 can include closing the first isolation valve 51 and waiting a prescribed period of time, such as, for example, about two seconds. Then, closing the second isolation valve 53 and waiting a prescribed period of time, such as, for example, about two seconds. Then, opening the backflush valve 61 to allow seawater from the seawater supply lines 46 to enter first into the slurry inlet lines 47, and subsequently into the RTP 20, to thereby backflush the RTP 20. One purpose for closing the first and second isolation valves 51, 53 is to prevent the seawater destined for the RTP 20 from entering the pump chambers 42, which could cause damage to the pump chambers 42. By thus backflushing the RTP 20, blockages in the RTP 20 can be cleared, after which normal pumping operations can be resumed.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A system for pumping material from a sea floor, the system comprising:

a subsea production tool to collect material on the sea floor;

a vessel positioned on the sea surface in communication with the subsea production tool to receive the material collected by the subsea production tool;

a riser attached to the vessel and extending toward the sea floor;

a lift pump in communication with the riser and the subsea production tool to pump the material collected on the sea floor to the vessel via the riser; and a riser transfer pipe connecting the subsea production tool and the lift pump;

the lift pump comprising:

a slurry inlet line attached to the riser transfer pipe;

a slurry return line attached to the riser;

a pump chamber between the slurry inlet line and the slurry return line to pump the material from the riser transfer pipe into the riser via the slurry inlet line and the slurry return line;

a seawater supply line in fluid communication with the pump chamber to provide seawater to power the pump chamber;

a backflush valve between the slurry inlet line and the seawater supply line to selectively allow fluid communication between the slurry inlet line and the seawater supply line so that seawater can enter the slurry inlet line and riser transfer pipe to backflush the riser transfer pipe.

2. The system of claim 1, further comprising:

an isolation valve between the backflush valve and the pump chamber to selectively isolate the pump chamber from the backflush valve when the backflush valve is open.

3. The system of claim 1, further comprising:

a pressure sensor positioned in the slurry inlet line to measure pressure of slurry entering the slurry inlet line from the riser transfer pipe.

4. The system of claim 3, further comprising:

a dump valve attached to the seawater supply line selectively openable to bleed seawater from the seawater supply line if the pressure of fluid in the slurry inlet line rises above a predetermined setpoint.

5. The system of claim 4, wherein the dump valve is closeable to prevent egress of seawater from the seawater supply line if the pressure of fluid in the slurry inlet line drops below a predetermined setpoint.

6. The system of claim 2, wherein the pump chamber comprises a plurality of pump chambers and the isolation valve comprises a plurality of isolation valves, and wherein each isolation valve corresponds to a discrete pump chamber or group of pump chambers.

7. A method of pumping material from a sea floor to a vessel on a sea surface, the method comprising the steps of:

a) collecting material from the sea floor using a production tool;

b) connecting the production tool to the vessel with a riser including a riser transfer pipe;

c) pumping the material from the production tool to the vessel using a subsea slurry lift pump positioned between the production tool and the vessel and attached to the production tool by the riser transfer pipe; and d) backflushing the riser transfer pipe by running seawater through the slurry lift pump into the riser transfer pipe toward the production tool.

8. The method of claim 7, wherein the subsea slurry lift pump comprises:

a slurry inlet line attached to the riser transfer pipe;

a slurry return line attached to the riser;

a pump chamber between the slurry inlet line and the slurry return line to pump the material from the riser transfer pipe into the riser via the slurry inlet line and the slurry return line;

a seawater supply line in fluid communication with the pump chamber to provide seawater to power the pump chamber; and a backflush valve between the slurry inlet line and the seawater supply line to selectively allow fluid communication between the slurry inlet line and the seawater supply line so that seawater can enter the slurry inlet line and riser transfer pipe to backflush the riser transfer pipe.

9. The method of claim 8, further comprising:

isolating the pump chamber from the backflush valve during step d) using an isolation valve.

10. The method of claim 8, wherein the subsea slurry lift pump further comprises:

a pressure sensor positioned in the slurry inlet line to measure pressure of slurry entering the slurry inlet line from the riser transfer pipe; and a dump valve attached to the seawater supply line.

11. The method of claim 10, further comprising:

opening the dump valve to bleed seawater from the seawater supply line if the pressure of fluid in the slurry inlet line rises above a predetermined setpoint.

12. The method of claim 10, further comprising:

closing the dump valve to prevent egress of seawater from the seawater supply line if the pressure of fluid in the slurry inlet line drops below a predetermined setpoint.

13. The method of claim 7, further comprising:

e) resuming pumping of material from the sea floor to the vessel after step d) is completed.

14. A method of clearing a riser transfer pipe during a subsea mining operation, the method comprising the steps of:

a) providing a production tool to collect material from the sea floor, a vessel to convey the material, and a subsea slurry lift pump to pump the material from the production tool to the vessel via a riser including the riser transfer pipe; and b) backflushing the riser transfer pipe by running seawater through the slurry lift pump into the riser transfer pipe toward the production tool.

15. The method of claim 14, wherein the subsea slurry lift pump comprises:

a slurry inlet line attached to the riser transfer pipe;

a slurry return line attached to the riser;

a pump chamber between the slurry inlet line and the slurry return line to pump the material from the riser transfer pipe into the riser via the slurry inlet line and the slurry return line;

a seawater supply line in fluid communication with the pump chamber to provide seawater to power the pump chamber; and a backflush valve between the slurry inlet line and the seawater supply line to selectively allow fluid communication between the slurry inlet line and the seawater supply line so that seawater can enter the slurry inlet line and riser transfer pipe to backflush the riser transfer pipe.

16. The method of claim 15, further comprising:

isolating the pump chamber from the backflush valve during step b) using an isolation valve.

17. The method of claim 15, wherein the subsea slurry lift pump further comprises:

a pressure sensor positioned in the slurry inlet line to measure pressure of slurry entering the slurry inlet line from the riser transfer pipe; and a dump valve attached to the seawater supply line.

18. The method of claim 17, further comprising:

opening the dump valve to bleed seawater from the seawater supply line if the pressure of fluid in the slurry inlet line rises above a predetermined setpoint.

19. The method of claim 17, further comprising:

closing the dump valve to prevent egress of seawater from the seawater supply line if the pressure of fluid in the slurry inlet line drops below a predetermined setpoint.

20. The method of claim 15, further comprising:

closing the backflush valve preparatory to resumption of pumping operations.

* * * * *